(12) United States Patent
    Richardson et al.

(10) Patent No.: US 10,471,370 B1
(45) Date of Patent: Nov. 12, 2019

(54) FRACTIONATION TRAYS WITH DOWNCOMERS ORIENTED AT 45 DEGREES

(71) Applicant: UOP LLC, Des Plaines, IL (US)

(72) Inventors: Kevin J. Richardson, Hamburg, NY (US); Brian J. Nowak, Orchard Park, NY (US); Michael J. Behm, Lockport, NY (US); David M. Wollaber, Lockport, IL (US); Shanda G. Fry, Wheatfield, NY (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/116,236

(22) Filed: Aug. 29, 2018

(51) Int. Cl.
    *B01D 3/22* (2006.01)
    *B01D 3/32* (2006.01)

(52) U.S. Cl.
    CPC ............... *B01D 3/326* (2013.01); *B01D 3/22* (2013.01)

(58) Field of Classification Search
    None
    See application file for complete search history.

(56) References Cited

U.S. PATENT DOCUMENTS

| 3,969,447 A * | 7/1976 | Glitsch | B01D 3/22 |
| | | | 261/111 |
| 2009/0256270 A1 * | 10/2009 | Griepsma | B01D 3/163 |
| | | | 261/114.5 |

* cited by examiner

*Primary Examiner* — Renee Robinson
*Assistant Examiner* — Derek N Mueller

(57) ABSTRACT

An arrangement of downcomers oriented at a 45-degree angle to a support that is either a wall within a divided wall column or a support beam that allows for reduced spacing of from 0.3 to 0.76 m spacing between trays within a distillation column. The advantages include the use of a single support beam to support two trays as well as more efficient operation and allowing for columns having diameters from 0.9 to 15.2 meters.

11 Claims, 4 Drawing Sheets

FRACTIONATION TRAYS WITH DOWNCOMERS ORIENTED AT 45 DEGREES

BACKGROUND OF THE INVENTION

The invention involves an arrangement of the fractionation trays used in distillation columns which separate volatile chemical compounds via fractional distillation. More particularly, the invention involves fractionation trays having downcomers oriented at a 45 degree angle to either a support beam that spans the diameter of a distillation column or to a divided wall in the case where the column is a divided wall column.

Fractionation trays are widely used in the petrochemical and petroleum refining industries to promote the multistage vapor-liquid contacting performed in fractionation columns. The normal configuration of a fractionation column includes about 10 to 120 individual trays. Normally the structure of each tray in the column is the same. The trays are mounted horizontally at uniform vertical distances referred to as the tray spacing of the column. This distance may vary within different parts of the column but is normally considered constant. The trays are normally supported by a ring welded or bolted to the inner surface of the column.

Fractionation trays previous to the present invention have a unit cell design due to a 90 degree rotation between trays which is ideal for using within a divided wall column. However, the wall makes it impossible to have the same hydraulic tray design for odd and even trays if the wall is parallel or perpendicular to the downcomer orientation. This is typical orientation that people would expect. The differences between odd and even trays become even greater if the dividing wall is slightly off of center. Therefore, the performance of the odd and even trays can differ and may be a cause for a hydraulic bottleneck.

In addition to difficulties found in conventional designs of fractionation trays with downcomers in divided wall columns, there are difficulties in conventional columns that do not include a divided wall. Trays require mechanical support that is normally achieved by using the downcomer as the main support structure. The problem is as column diameters have become larger, downcomer height must be increased in order to meet the criteria for tray deflection. This in turn causes the design tray spacing to increase to accommodate the deeper downcomer. The tray spacing is therefore determined or limited by mechanical constraints and not by process/hydraulic constraints. A significant advantage of the trays is the relatively low tray spacings of about 12 in (30.48 cm) that can be achieved as compared to competitor technologies. At large diameters this advantage begins to erode as the tray spacings need to be increased in order to meet mechanical design criteria. A low tray spacing allows a significant number of MD/ECMD trays to be contained in a single shell or possibly to reduce the column height to meet customer restrictions giving a technical advantage in the marketplace. While I-beams could be used for very large diameter columns greater than 9.7 m (>32 ft.), a relatively high tray spacing is still required. The issue is that in prior art configurations, the I-beams are perpendicular to the downcomers that it is supporting and parallel to the downcomers to the tray below. The beam is therefore directly above the active tray deck below and has the potential to interfere with vapor flow through that particular deck segment that is below it. Another issue is if the beam is wide in being greater than 15 cm (6 in.) there is difficulty getting liquid under the I-beam to feed the active tray deck below. These two concerns can potentially cause maldistribution and poor column performance. In order to reasonably prevent these issues, the I-beam height is limited so it can only extend slightly below the downcomer bottom, therefore limiting its strength.

SUMMARY OF THE INVENTION

The invention provides a tray assembly for a distillation column comprising a support beam or a wall, a plurality of downcomers contacting the support beam or the wall and extending at about a 45 degree angle from the support beam or the wall. The tray assembly may include a plate having a plurality of openings above the downcomers.

The tray support beam may have an upper flange and a lower flange extending along an entire length of the support beam which may be configured as an I-beam. The tray assembly's support beam provides support for both an upper layer of downcomers and a lower layer of downcomers which allows for the layers to be spaced closer together than prior art installations. In a preferred embodiment of the invention, the upper layer of downcomers is perpendicular to the lower layer of downcomers. The invention allows for the tray assembly to have a maximum diameter of about 0.9 to 15.2 m (3 to 50 feet) and typically about 9.1 m (30 feet). The tray assembly allows for layers that are a minimum of 0.3 to 0.76 m (11 to 30 inches) and typically about 12 inches (0.3 m) apart. The tray assembly may comprise at least one of the following: a sensor for sensing at least one parameter and capable of generating a signal from the sensing; a component capable of generating and transmitting a signal; or a component capable of generating and transmitting data regarding the operation of the tray assembly.

DETAILED DESCRIPTION OF THE INVENTION

Figure 1:
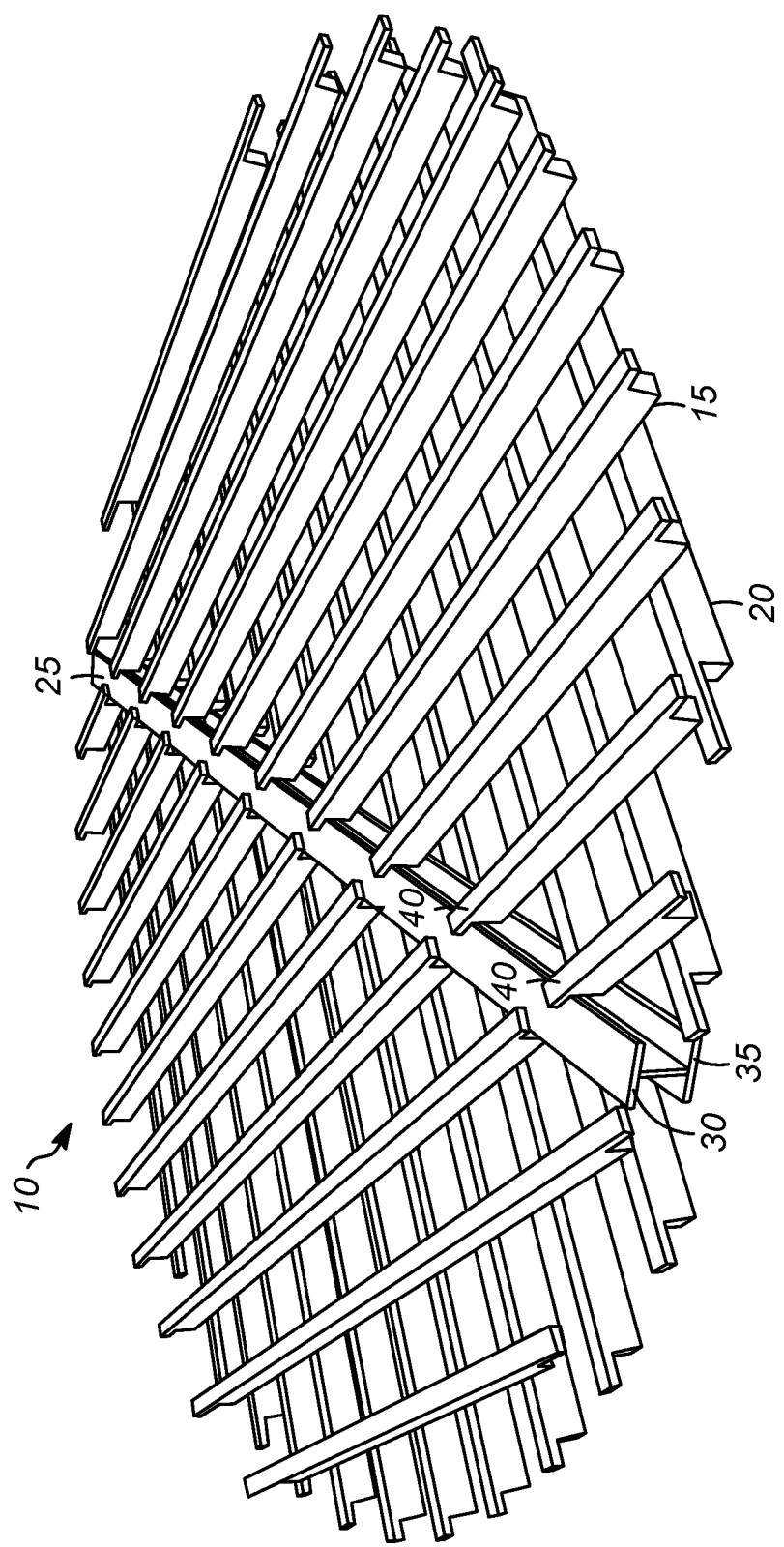
FIG. 1 shows a set of downcomers for a fractionation tray that are oriented at 45 degrees with respect to a support beam.

Fractionation columns are used in the separation of a wide variety of chemical compounds in the petroleum refining, petrochemical and chemical industries. They are used for instance in the separation of various paraffinic hydrocarbons such as the separation of butanes and pentanes, in removing contaminants including water from hydrocarbon streams and the separation of various alkyl aromatic hydrocarbons such as the separation of toluene from xylenes. Fractionation trays are also used for the separation of oxygenates such as ethers or alcohols from hydrocarbons, the separation of inorganics such as halogenated compounds, fluorocarbons and elemental gases and other separations too numerous to mention. Fractionation columns and trays therefore have great utility in many industries.

During the fractional distillation process, vapor generated at the bottom of the column rises through the large number of small perforations spread over the decking area of the tray, which supports a quantity of liquid. The passage of the vapor through the liquid generates a layer of bubbles referred to as froth. The high surface area of the froth helps to quickly establish a compositional equilibrium between the vapor and liquid phases on the tray. The vapor loses less volatile material to the liquid and thus becomes slightly more volatile as it passes upward through each tray. The concentration of less volatile compounds in the liquid increase as it moves down from tray to tray. The liquid separates from the froth and travels downward to the next lower tray. This froth formation and separation is performed on each tray. Trays therefore perform the two functions of contacting the rising vapor with liquid and then allowing the two phases to separate and flow in different directions. When the steps are performed a suitable number of times, the process can lead to highly effective separation of chemical compounds based upon their relative volatility.

This invention is readily applied to multiple downcomer trays. Multiple downcomer trays have several distinguishing physical characteristics. For instance, a multiple downcomer tray does not have a "receiving pan". This is the normally imperforate section located below an outlet downcomer opening. It is the imperforate area of a tray upon which the liquid descending through the downcomer impacts before passing horizontally onto the decking of the tray. Receiving pans are normally located directly below the downcomer leading from the next above conventional fractionation tray. The horizontal decking surface area of the preferred embodiment of a multiple downcomer fractionation tray is divided into depressed areas functioning as downcomers and flat vapor-liquid contacting area normally referred to as decking. There are no imperforate areas allocated to receiving descending liquid from the tray located immediately above.

Another distinguishing feature of a typical multiple downcomer type fractionation tray is the provision of a relatively large number of parallel downcomers evenly spaced across the tray. Each tray can employ from one to fifteen or more downcomers. These downcomers are spaced relatively close together compared to the downcomers of crossflow fractionation trays as they are spread across the surface of the tray rather than just being at the periphery of the tray. The distance between adjacent downcomers (measured between their side walls) of a multiple downcomer tray will be between 0.2 and 2.0 meters and is preferably less than 0.5 meter.

The deck portions between any downcomers on the tray is preferably substantially planar, that is flat, and orientated in a horizontal plane. These decking portions are preferably provided with uniformly distributed openings of adequate total cross-sectional open area to allow the total expected vapor flow to pass upward through the tray at a suitable velocity. Uniform circular openings of a standard sieve tray are preferred but can be supplemented by vapor flow directing slots. The open area provided by deck perforations may vary from 5% to as high as 30-45% of the tray deck area. The circular perforations are usually from about 0.3 to about 0.6 cm but can be up to 1.87 cm in diameter.

As used herein, the term "column" (or "exchange column") means a distillation or fractionation column or zone, i.e., a column or zone where liquid and vapor phases are countercurrently contacted to effect separation of a fluid mixture, such as by contacting of the vapor and liquid phases on packing elements or on a series of vertically-spaced trays or plates mounted within the column.

A divided wall column is in principle a simplification of a system of thermally coupled distillation columns. In divided wall columns, a dividing wall is located in the interior space of the column. The dividing wall generally is vertical. Two different mass transfer separations may occur on either side of the dividing wall.

The exchange column usually contains some form of vapor-liquid contacting device which may be in the form of packing, such as random or structured packing, or in the form of a fractionation tray(s). A fractionation tray typically comprises a large flat area referred to as the decking or contacting deck of the tray plus means to deliver liquid to the tray from the next tray above and to remove liquid for passage to the next tray below.

The liquid being removed from the tray flows through a part of the tray referred to as a downcomer. The downcomer is a conduit for downward passing of liquid arranged in an opening in a panel of the contacting deck. In some downcomers, a part of the wall of the downcomer may extend above the panel and is called the outlet weir, and the part of the downcomer extending below the panel is called the downcomer apron. However, outlet weirs often are separate mechanical pieces and not necessarily an extension of the downcomer wall. In fact, trays may be designed without outlet weirs.

Vapor generated in the lower portion of the column passes upward through perforations in the decking, while the liquid flows downward from tray to tray countercurrent to the vapor. With a "crossflow tray" the liquid first enters upon a tray from the downcomer of the tray above. It then passes across the decking of the tray and finally exits through an outlet downcomer of the tray. U.S. Pat. No. 6,645,350 (Steacy) discloses one type of "crossflow tray."

During normal operation, liquid collected on a tray flows over a perforated panel of the deck where it is contacted with upwardly flowing vapor passing through the perforations. Then the liquid flows over the outlet weir into the downcomer and onto the receiving area of the perforated panel of the tray below, and so on. The downcomers of two adjacent trays are not placed directly above each other, but spaced apart in lateral direction (or staggered) in order to prevent liquid from falling directly into the downcomer of the lower tray.

This invention changes the configuration of a support beam and in some embodiments of the invention, an I-beam placement to a 45 degree angle to the tray downcomers. This allows the use of a thicker I-beam with the I-beam height increased to be the full tray spacing (plus flange thickness), significantly increasing its strength and also allowing a single I-beam to support two trays. The trays may be either MD or ECMD trays as known to those of skill in the art. The bottom flange supports one tray and the top flange supports another tray. In this configuration the I-beams do not encroach onto active tray deck since the beams are all in the same orientation, right above each other. The previous state of the art utilized beams that were rotated 90 degrees on successive trays to correspond to the MD/ECMD tray orientation. With the I-beams at 45 degrees and all having the same orientation, there is no active tray deck below them so there is no need to send liquid under them as with the previous configuration. This significantly reduces the potential of liquid/vapor maldistribution. Studies have found it is possible to maintain the low tray spacing of about 12 inches (30.48 cm) even at very large diameters approaching 30 feet or more which should allow close spacing of trays to be maintained even at large diameters. Previously the diameter limit was closer to 19 feet (5.8 meters) with the closely spaced trays to be able to sustain the low design tray spacing. In the present invention, the layers of trays may be from 0.3 to 0.76 m (11 to 30 inches) apart.

In another embodiment of the invention, the downcomers are oriented at a 45-degree angle to a divided wall in a divided wall column. As previously mentioned, fractionation columns find a large utility in many industrial processes. A conventional fractionation column is employed to separate an entering feed stream into two fractions. These are referred to as the overhead and bottoms fraction, with the overhead fraction being the lighter or more volatile components of the feedstream. The feedstream may comprise only two components which are separated into high purity streams within the fractionation column. In this instance the overhead stream and the bottoms stream would each be rich in one of the two components of the feedstream. In many instances, however, the feedstream contains three or more compounds and in the instance of petroleum refining processes, the feedstream may contain 100 or 200 or more separate volatile chemical compounds. These mixtures are typically divided by boiling point range into fractions which may each contain numerous different volatile compounds.

In order to separate a feedstream comprising three compounds into single product streams, each rich in one of the, compounds with conventional columns it is necessary to employ two such fractionation columns. The first fractionation column would form a product stream having a high content of either the lightest or heaviest desired component of the feedstream and a second product containing the remaining components. The second product is then passed into a second fractionation column to divide this second product into two other product streams. It was recognized approximately 50 years ago that these two columns can, in some instances, be integrated into a single column with beneficial reductions in utilities and capital cost. This evolved through energy coupling and then mechanical integration of the columns to yield what is today referred to as "dividing wall" or "divided wall" columns. The lower capital and operating costs of dividing wall columns has now been recognized and they are being employed with increasing frequency in the petrochemical and petroleum refining industries.

As previously mentioned, a prime function of the downcomer of a fractionation tray is the separation of the mixed phase material. ("froth") which enters the downcomer into "clear liquid" and vapor, with the vapor being released through the inlet at the top of the downcomer and the clear liquid being carried down to the next lower tray. Vapor present above the tray has contacted the liquid on the tray and should be in equilibrium with it. There is no need to recontact the vapor with the liquid. Entrainment of vapor into the liquid being passed to the next lower tray decreases the performance of the tray and, therefore, of the column. Hence entrainment of vapor into the liquid is undesirable.

This invention allows low tray spacings for very large diameter columns based on hydraulic constraints and not altered by the mechanical constraints. The invention may be better understood by reference to the Figures. FIG. 1 shows an example of the orientation of the downcomers relative to an I-beam in assembly 10 that is the support for the downcomers. I-beam 25 (also referred to as support beam herein) is shown with an upper flange 30 and a lower flange 35. A top layer of downcomers 15, each having an extension 40 that rests on flange 30 of I-beam 25. The top layer of downcomers 15 are shown abutting I-beam 25 at a 45-degree angle. A lower layer of downcomers 20 is also shown with an extension 40 resting on lower flange 35 of I-beam 25. When the downcomers are described as being at a 45-degree angle to the support beam, the 45 degrees is within about 0.5 degrees since any greater deviation will not be effective. The top and bottom layers of downcomers are then about 90 degrees or perpendicular with each other.

Figure 2:
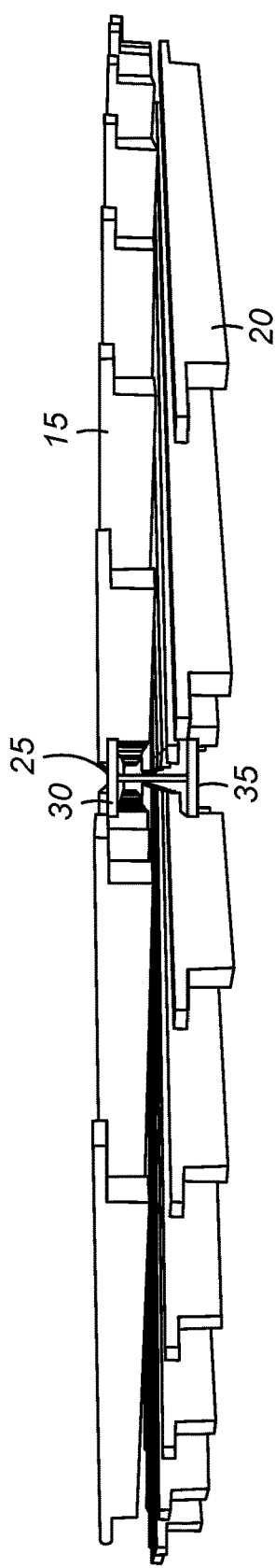
FIG. 2 shows an side view of a set of downcomers connecting to a support beam.

FIG. 2 shows a side view of the apparatus of the invention with I-beam 25 having top flange 20 and bottom flange 35. A top layer of downcomers 15 and lower layer of downcomers 20 is shown.

Figure 3:
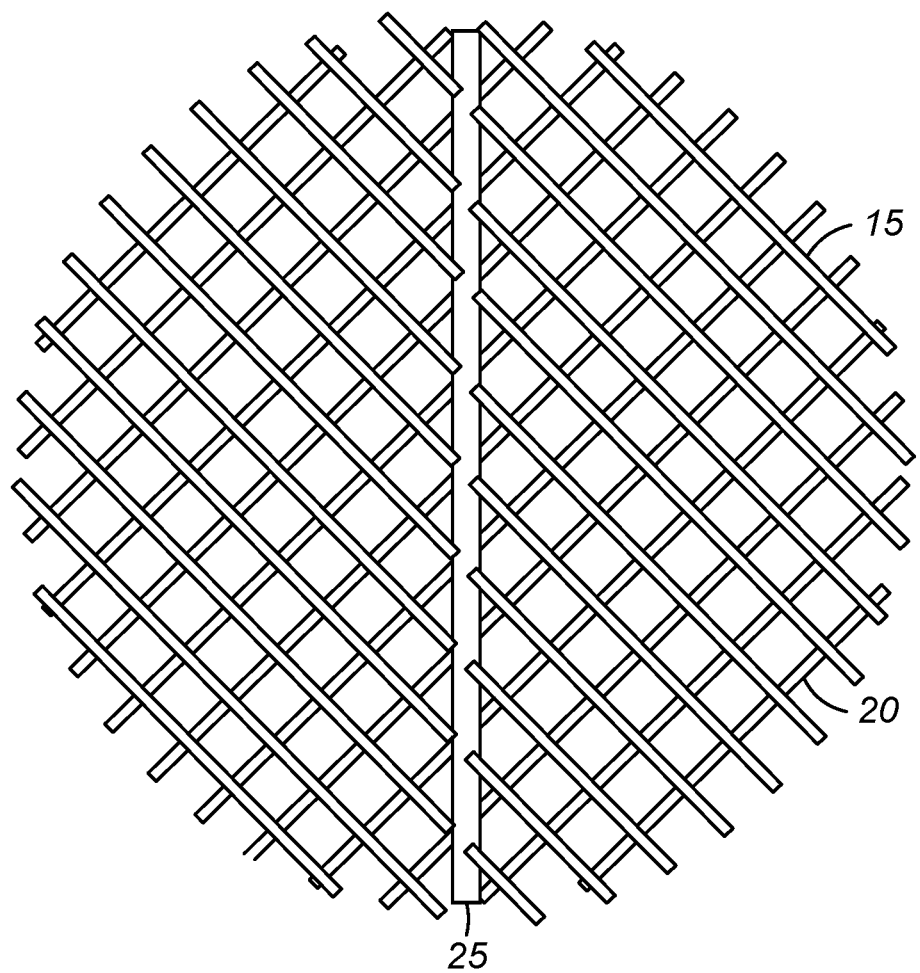
FIG. 3 shows a view from above of a set of downcomers connecting to a support beam.

FIG. 3 shows the relative orientation of the top layer 15 and bottom layer 20 of downcomers to each other as well as to I-beam 25. The top and bottom layers are oriented perpendicular to each other.

Figure 4:
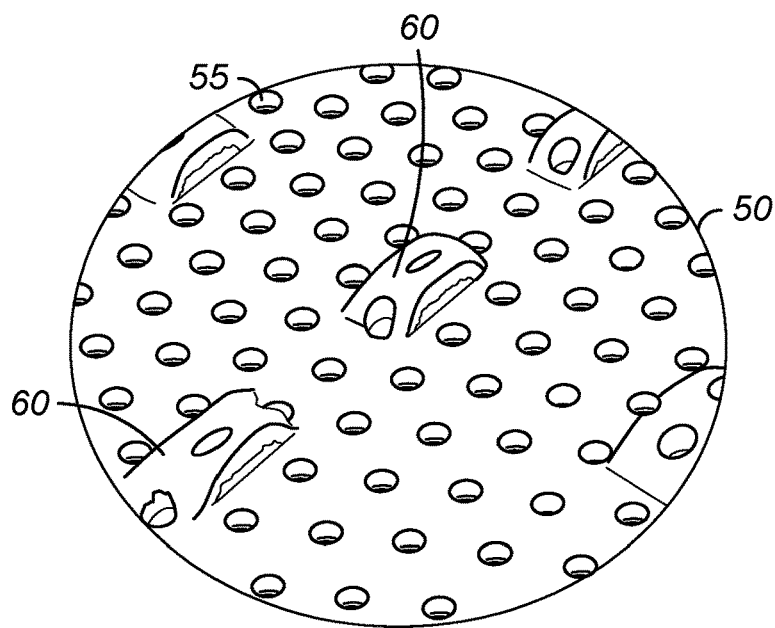
FIG. 4 shows a portion of a deck layer with round openings and slots.

FIG. 4 shows a typical layer of decking that may be located between sets of downcomers. In this example, decking 50 that is generally a metal material suitable for the pressures and temperatures found within a reactor that has a plurality of generally round openings 55 and slots 60 for the passage of vapor and liquid. In some embodiments of the invention, the decking only has the round openings 55.

Figure 5:
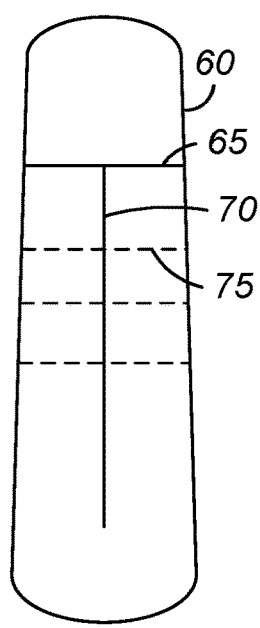
FIG. 5 shows a column having a divided wall and a plurality of trays.

FIG. 5 shows a divided wall column 60 having a support 65. Extending downward from support 65 is a divided wall 70 that has a plurality of layers of trays 75 shown that are similar to the layers of trays from the previous Figures.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a tray assembly for a distillation column comprising a support beam or a wall, a plurality of downcomers contacting the support beam or the wall and extending at about a 45 degree angle from the support beam or the wall. An embodiment of the invention is one, any or all of the prior embodiments in this paragraph up through the first embodiment in this paragraph where the tray assembly further comprises a plate having a plurality of openings above the downcomers. An embodiment of the invention is one, any or all of the prior embodiments in this paragraph up through the first embodiment in this paragraph wherein the tray assembly comprises a support beam having an upper flange and a lower flange extending along an entire length of the support beam. An embodiment of the invention is one, any or all of the prior embodiments in this paragraph up through the first embodiment in this paragraph wherein the support beam is an I-beam. An embodiment of the invention is one, any or all of the prior embodiments in this paragraph up through the first embodiment in this paragraph wherein the tray assembly comprises an upper layer of downcomers and a lower level of downcomers. An embodiment of the invention is one, any or all of the prior embodiments in this paragraph up through the first embodiment in this paragraph wherein the upper layer of downcomers is perpendicular to the lower layer of downcomers. An embodiment of the invention is one, any or all of the prior embodiments in this paragraph up through the first embodiment in this paragraph wherein the tray assembly has a diameter of about 0.9 to 15.2 m. An embodiment of the invention is one, any or all of the prior embodiments in this paragraph up through the first embodiment in this paragraph wherein the tray assembly has a diameter of about 9.1 m. An embodiment of the invention is one, any or all of the prior embodiments in this paragraph up through the first embodiment in this paragraph wherein each of the layers is 0.3 to 0.76 m (11 to 30 inches) apart. An embodiment of the invention is one, any or all of the prior embodiments in this paragraph up through the first embodiment in this paragraph wherein the tray assembly further comprises at least one of a sensor for sensing at least one parameter and capable of generating a signal from the sensing; a component capable of generating and transmitting a signal; a component capable of generating and transmitting data regarding the operation of the tray assembly.

The invention claimed is:

1. A tray assembly for a distillation column comprising a support beam or a wall, a plurality of downcomers contacting said support beam or said wall and extending at about a 45 degree angle from said support beam or said wall.

2. The tray assembly of claim 1 further comprising a plate having a plurality of openings above said downcomers.

3. The tray assembly of claim 1 wherein said tray assembly comprises a support beam having an upper flange and a lower flange extending along an entire length of said support beam.

4. The tray assembly of claim 1 wherein said support beam is an I-beam.

5. The tray assembly of claim 1 comprising an upper layer of downcomers and a lower layer of downcomers.

6. The tray assembly of claim 5 wherein said upper layer of downcomers is perpendicular to said lower layer of downcomers.

7. The tray assembly of claim 1 having a diameter of about 0.9 to 15.2 m.

8. The tray assembly of claim 1 having a maximum diameter of about 9.1 m.

9. The tray assembly of claim 5 wherein said upper and lower layers are a minimum of about 0.3 to 0.76 m apart.

10. The tray assembly of claim 5 wherein said upper and lower layers are a minimum of about 0.3 m apart.

11. The tray assembly of claim 1, further comprising at least one of:
   a sensor for sensing at least one parameter and capable of generating a signal from the sensing;
   a component capable of generating and transmitting a signal;
   a component capable of generating and transmitting data regarding the operation of the tray assembly.

* * * * *